United States Patent Office.

COLUMBUS A. ROSE, OF COLUMBUS, GEORGIA.

Letters Patent No. 64,449, dated May 7, 1867.

IMPROVEMENT IN THE MANUFACTURE OF PAPER PULP.

*The Schedule referred to in these Letters Patent and making part of the same.*

TO ALL WHOM IT MAY CONCERN:

Be it known I, COLUMBUS A. ROSE, of Columbus, in the county of Muscogee, and State of Georgia, have invented a new and useful Improvement in the Manufacture of Paper; and I do hereby declare the following to be a full and exact description of the same.

The improvement consists in the use of certain materials found in great abundance in the South, and there treated as refuse, being deemed fit for nothing but the manure heap or to burn. I propose to use pine leaves, which will be generally found associated with oak leaves from the underbrush, and are not injured thereby, in combination with the abandoned stalks of the cotton plant, including the empty hull or calyx. The pine leaves of the southern forests afford an immense store of leaves, frequently the accumulation of several years, and their fibrous and cellular character fits them for use as pulp when properly macerated. The underbrush of the pine woods consists, to a great extent, of oak, and the deciduous oak leaves, together with pine cones, will be found associated with the leaves upon the ground, and will be swept up therewith in gathering. The cotton stalks, as is well known, are cut, piled, and burned in the spring, to clear the ground for another crop, and I propose to utilize them in combination with the pine leaves, &c., as the long fibre of the bark of the cotton stalk and of the pine leaves gives tenacity and strength to the more cellular texture of the body of the stalk.

The utilization of the two articles, which I use thus associated, will prove a source of industry and profit to a large section of county where such an accessory is much needed—a profit derived from materials considered and treated as mere refuse. These materials are chosen for their elongated cells, their pith cells, and their intercellular and other substances connected with their fibre, which particularly fit the combination for the manufacture of paper.

Having described my invention, what I claim as new, and desire to secure by Letters Patent, is—

The combination of pine leaves and cotton stalks, either with or without the addition of oak leaves and pine cones, as a material for making paper pulp.

To the above specification of my improvement in the manufacture of paper I have signed my hand this third day of April, 1867.

C. A. ROSE.

Witnesses:
EDWARD H. KNIGHT,
CHAS. D. SMITH.